W. GREGORY.

MEANS FOR OPERATING GANG PLOWS.

APPLICATION FILED SEPT. 1, 1911.

Reissued Nov. 23, 1915.

14,018.

4 SHEETS—SHEET 1.

Witnesses
George E. Edelin
R. S. Gehr

INVENTOR
Walter Gregory
By H. H. Bliss.
Attorney

W. GREGORY.
MEANS FOR OPERATING GANG PLOWS
APPLICATION FILED SEPT. 1, 1911.
Reissued Nov. 23, 1915.
14,018.
4 SHEETS—SHEET 2.
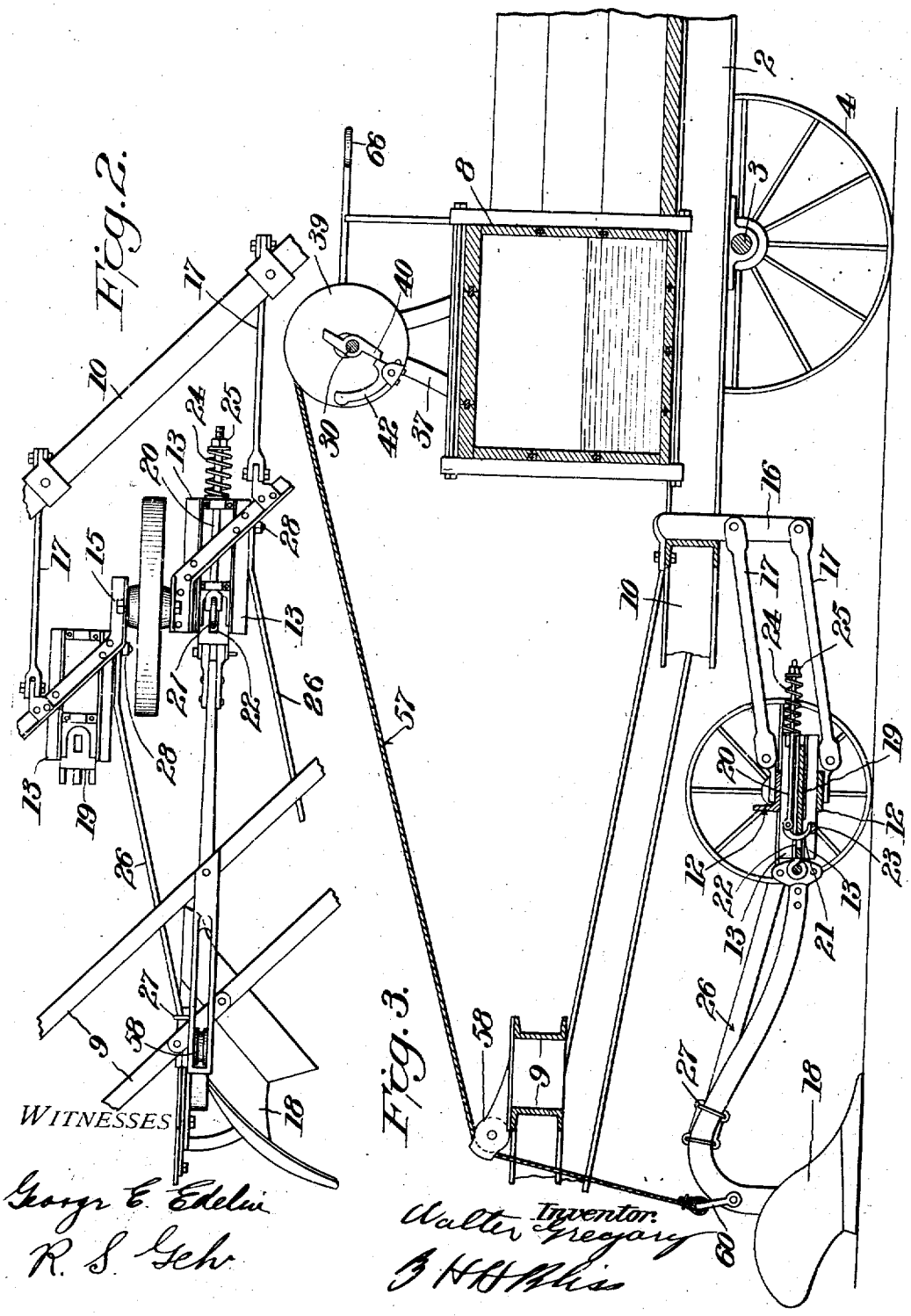

W. GREGORY.

MEANS FOR OPERATING GANG PLOWS.

APPLICATION FILED SEPT. 1, 1911.

Reissued Nov. 23, 1915. 14,018.

4 SHEETS—SHEET 3.

WITNESSES:

George E. Edelin

R. S. Gehr

Inventor.

Walter Gregory

By H. H. Blin

Attorney

W. GREGORY.
MEANS FOR OPERATING GANG PLOWS.
APPLICATION FILED SEPT. 1, 1911.
Reissued Nov. 23, 1915.
14,018.
4 SHEETS—SHEET 4.
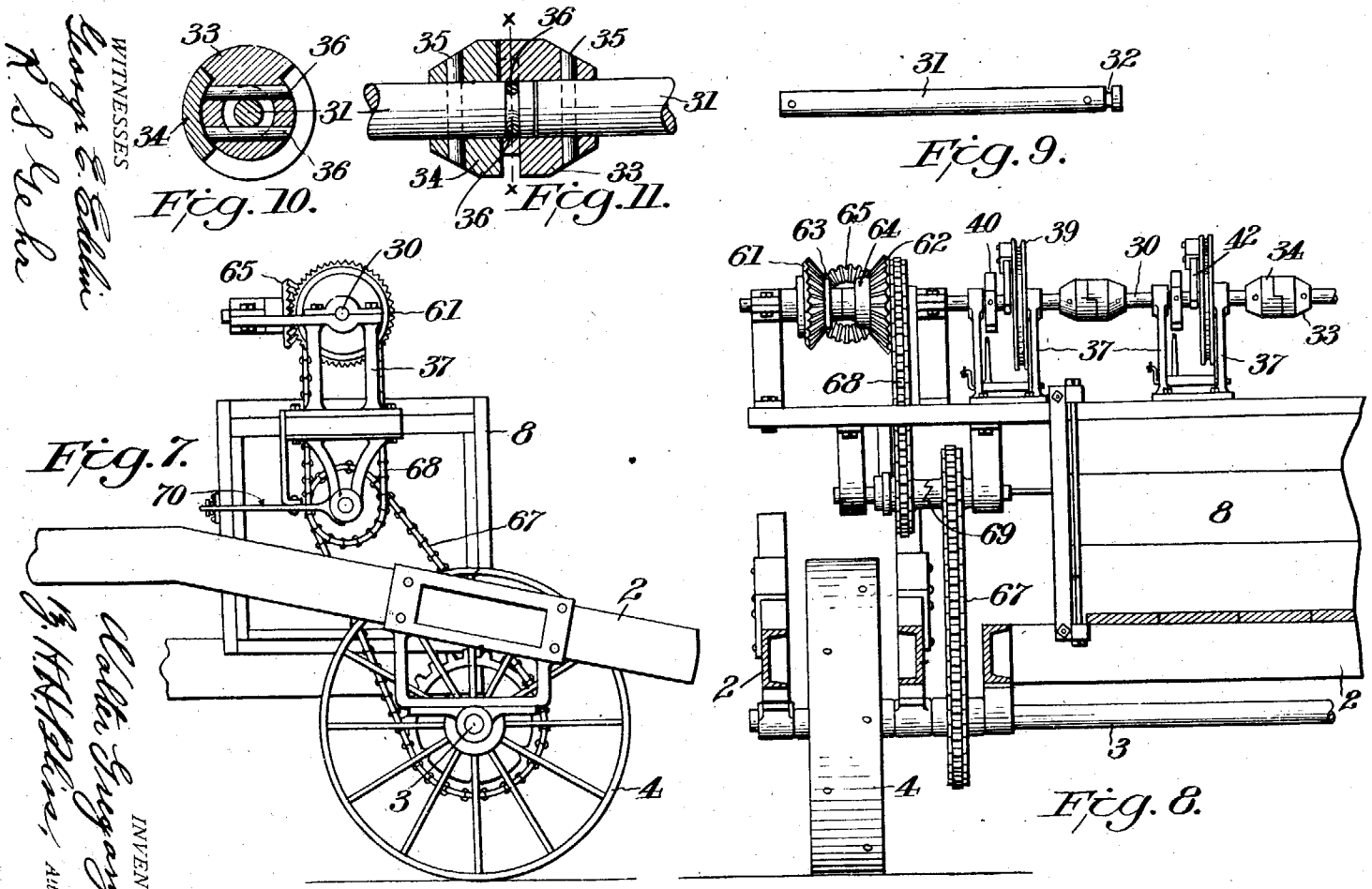
WITNESSES
George E. Edelin
R. S. Gehr
INVENTOR
Walter Gregory
By H. H. Bliss, Attorney

UNITED STATES PATENT OFFICE.

WALTER GREGORY, OF MINNEAPOLIS, MINNESOTA, ASSIGNOR, BY MESNE ASSIGNMENTS, TO AVERY COMPANY, OF PEORIA, ILLINOIS, A CORPORATION OF ILLINOIS.

MEANS FOR OPERATING GANG-PLOWS.

14,018. Specification of Reissued Letters Patent. Reissued Nov. 23, 1915.

Original No. 819,423, dated May 1, 1906, Serial No. 273,024. Application for reissue filed September 1, 1911. Serial No. 647,535.

*To all whom it may concern:*

Be it known that I, WALTER GREGORY, of Minneapolis, Hennepin county, Minnesota, have invented certain new and useful Improvements in Means for Operating Gang-Plows, of which the following is a specification.

This invention relates to gang plows such as are drawn by a traction engine and which usually comprise a main frame adapted to be hitched to and drawn by a tractor, and a series of plows connected to said frame and arranged in a line oblique to the line of draft so that the plows in turning the soil will not interfere with each other.

The object I have in view is to provide means whereby the individual plows can be raised in succession one after another when the machine reaches the end of the field being plowed, whereby the furrows will all end on the same line.

The invention consists generally in providing a gang plow of the character referred to with means for raising the plows one after another.

The invention consists, further, in the constructions and combinations hereinafter described, and particularly pointed out in the claims.

Figure 1:
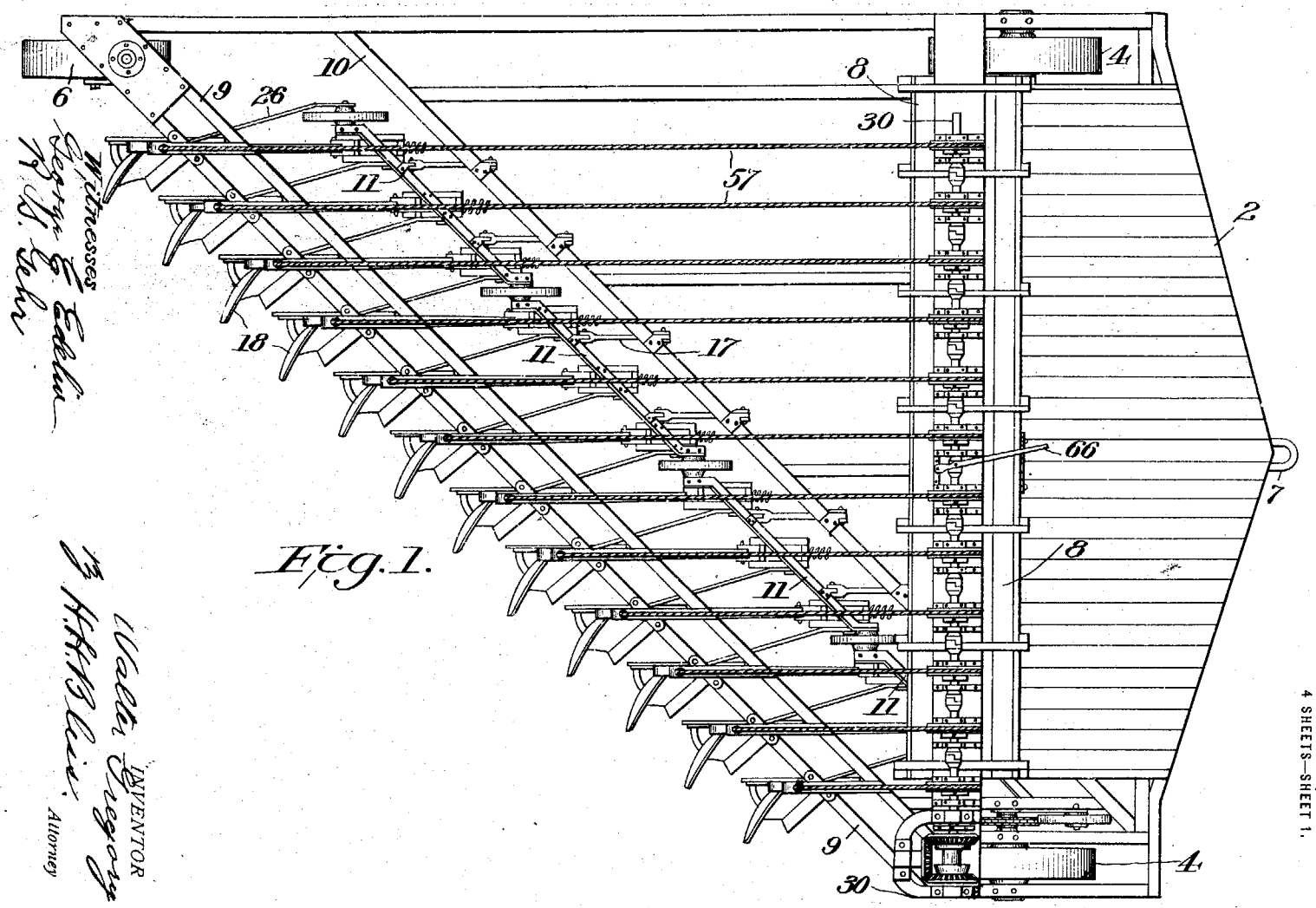
Figure 5:
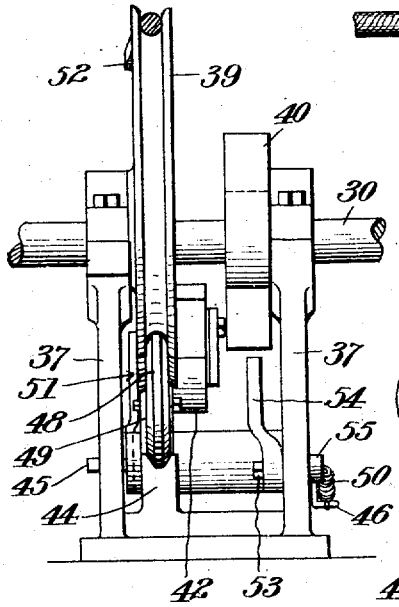
Figure 4:
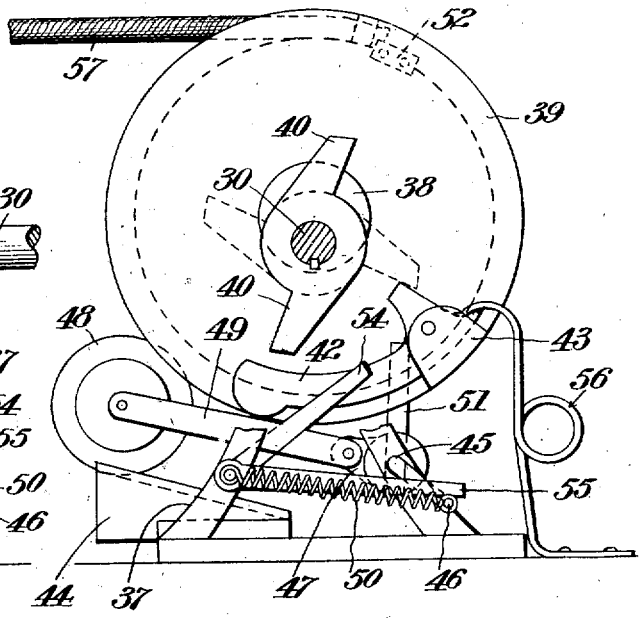
Figure 6:
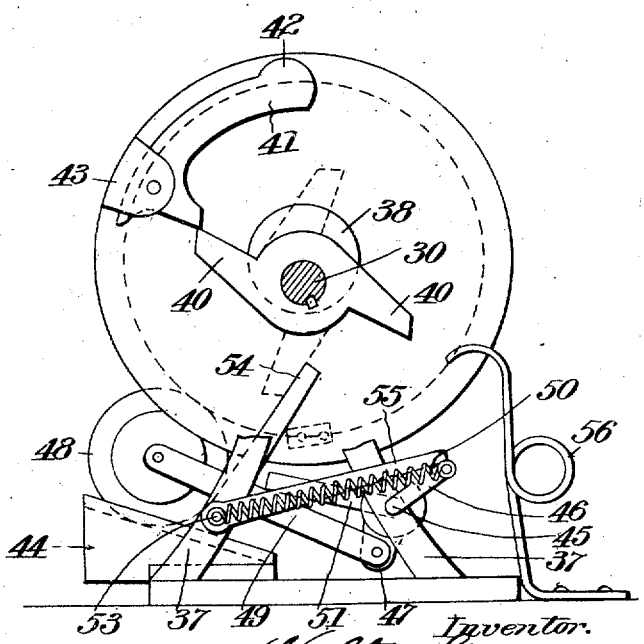

In the accompanying drawings, forming part of this specification, Figure 1 is a plan view of a gang of plows embodying my invention. Fig. 2 is a detail plan view, on a larger scale, showing one of the plows and the means for connecting the operating mechanism. Fig. 3 is a side elevation of one of the plows and the means for raising and lowering the same. Fig. 4 is a detail side elevation showing the lifting device when out of operation. Fig. 5 is an end elevation of the parts shown in Fig. 4. Fig. 6 is a detail side elevation of the parts shown in Fig. 4, but shown in the act of raising a plow. Fig. 7 is a detail side elevation of the means for operating the lifting devices. Fig. 8 is an end elevation of the same. Fig. 9 is an elevation of one of the short shafts. Figs. 10 and 11 are details of the couplings.

In the drawings, 2 represents a suitable frame or platform, preferably of substantially triangular form, mounted upon a suitable axle 3, supported upon driving-wheels 4. The rear of the frame is provided with a suitable supporting wheel 6. This platform and its supporting axle and wheels form a carriage adapted to be hauled across the field to be plowed by a traction-engine, or other suitable means, the carriage being provided at its forward end for the purpose of coupling it with a traction engine with a suitable coupling 7. If preferred, a water-tank 8 for the engine may be mounted upon this carriage, or the carriage may be used for transporting anything that it is desired to use in connection with the engine or plows. This platform is provided with the parallel bars or beams 9 and 10, which form a part of said platform and also provide a draft-bar for the series of plows. Arranged in the rear of the beam 10 are the carriages 11, preferably four in number, and each consisting of the parallel bars 12, 12, between which are arranged the guide and coupling plates 13. The upper bar 12 is preferably formed of angle-irons with its ends turned so as to extend parallel with the plow-beam, and wheels 14 are mounted to turn freely on short shafts 15, secured in the ends of said bars. By this means the carriages 11 are flexibly connected together and are adapted to adjust themselves to uneven surfaces of the ground upon which the machine is used. The beam 10 is provided with a depending standard 16, and connecting-rods 17 are pivoted to said standards and also to the carriage-bars 12. These connecting-rods are preferably attached near each end of each carriage, and by this means said carriages are drawn over the ground with the frame or platform 2. I provide a series of plows 18, which may be of any usual or preferred construction. Any number of said plows may be employed with one machine. I have shown twelve plows connected to a single platform; but more or less may be used, as preferred. The forward end of each plow-beam is pivotally connected to a plate 19, adapted to slide between the guide and coupling plates 13. For the purpose of releasably connecting said plates to the carriages 11, I provide a coupling-rod 20, having a hook 21 adapted to pass through an opening 22 in the plate 19 and to have its free end engaged with a lug 23 on the carriage. The other end of the coupling rod 20 is provided with a spring 24, which bears against the carriage, while its opposite end is engaged by a nut 25, adjustably arranged on the end of the coupling rod. When the parts are in the position shown in Fig. 3 of the drawings, the plow 18 is coupled to the carriage 11 and will remain so coupled so long as the strain upon the plow does not overcome the tension of the spring 24. Should the plow strike a stone or other obstruction, the spring 24 will yield, and if the resistance caused by such obstruction is greater than the tension of the spring 24 the coupling rod will slide in its bearings until the end of the hook 21 is disengaged from the lug 23, when the hook will fly out of the hole 22 and the plow will be released. By this means the danger of breaking plows when they strike stones or other obstructions is overcome.

For the purpose of bracing each plow so as to prevent it from being swung toward the land, I provide a brace-bar 26, which has its rear end secured to the plow-beam by a clamp 27, and its slotted forward end engages a bolt 28 upon one of the carriages 11. This bolt is preferably arranged upon the next succeeding guide and coupling plate 13. (See Fig. 2.) In each instance I have shown the brace-bar 26 so arranged except in connection with the last plow of the series, and in this case the forward end of the brace-bar 26 is engaged with the axle 15 of the last carriage-wheel 14. (See Fig. 1.)

The means that I prefer to employ for raising the plows in succession one after another, so that the ends of furrows will all be even or in line with one another, are preferably driven from one of the platform-wheels and consists, essentially, of a series of "pickups" which lift or pick up the plows in succession, one after another, the interval between the lifting of one plow and the lifting of the succeeding plow being sufficient to cause said plows to be raised at the same point over the surface of the ground, thereby causing the ends of the furrows to all be substantially in line one with another.

Mounted in suitable standards upon the frame of the machine is a rotatable shaft consisting of a series of short shaft sections, arranged in line with one another and coupled together, so that as the first section is rotated it will make a half-revolution, more or less, before the next section begins to rotate and so on throughout the series. In the drawings I designate the shaft as a whole by the reference-figure 30 and each of the sections (see Fig. 9) by the reference-figure 31. Each section is provided near one end with an annular recess or groove 32 and the meeting ends of the sections are provided with the coupling-sections 33 and 34, secured to the ends of the shaft-section by suitable pins 35. Pins 36 pass through the coupling-section 35 and engage the annular groove in the next succeeding shaft section. (See Figs. 10 and 11.) With this construction each shaft-section is permitted a partial revolution (as here shown substantially a half-revolution) before the next succeeding shaft-section begins to rotate. I provide a pair of standards 37 for each shaft-section, (see Fig. 8) and upon one of each pair of said standards I arrange an eccentric 38, which is rigidly secured thereto and upon which is mounted, so as to turn freely thereon, a disk or pulley 39. The disks 39 are each free to rotate upon the corresponding eccentric 38, such rotation changing the position of said disk or pulley in relation to the platform upon which the shaft-bearing standards 37 are secured. Secured to the shaft-section 31 in proximity to each disk 39 is a suitable hub carrying two oppositely-projecting arms 40. This hub is fast on the shaft-section, so as to rotate therewith. Upon the face of the pulley 39 is a pivoted dog 41, having a long weighted arm 42. This arm is preferably pivoted between the face of the disk 39 and a lug 43 secured to the edge of said disk and extending over said arm. Arranged below said shaft and disk is an inclined block 44, and mounted in bearings in the shaft-standards 37 is a short shaft 45, having upon one end a crank-arm 46 and upon its other end a crank-arm 47. A small wheel 48 is arranged between the upper surface of the block 44 and the edge of the grooved disk or pulley 39. (See Figs. 4, 5, and 6.) A rod 49 connects the axis of this wheel with the crank-arm 47. A spring 50 is connected to the end of the crank 46 and to a pin or stud on one of the standards 37. (See Figs. 4 and 6.) The shaft 45 may be turned so as to carry the end of the crank-arm 46 above or below the center of the shaft, and when said shaft is turned so as to carry the end of the crank-arm 46 past the center the movement of said shaft will be completed by the spring 50, and said crank-arm will be held in either limit of its position by said pin. The end of the shaft 45 is also provided with an arm 51, extending upward and adapted to be raised into position in proximity to the face of the disk 39, opposite that to which the arm 41 is pivoted. (See Figs. 4, 5 and 6.) A lug 52 is provided on this face of the disk in position to engage the arm 51 when it stands in an upright position (see Fig. 4) and to move said arm downward as the disk 39 is rotated until the crank-arm 46 passes the center, when the tension of the spring 50 will turn the shaft 45 into the position shown in Fig. 6 of the drawings. It is also necessary to provide means for turning the shaft 45 into the reverse position when the shaft-sections 31 are given a reverse movement. For this purpose I provide a short shaft 53 in one of the standards 37 and upon the ends of this shaft arrange the arms 54 and 55. Upon a reverse movement of the shaft-section 31 the arm 54 will be engaged by the arm 40 on said shaft, and thereby the shaft 45 will be turned from the position shown in Fig. 6 to that shown in Fig. 4. When the parts stand in the position shown in Fig. 4, the wheel 48 is near the upper end of the block 37 and, resting upon said block, does not come in contact with the edge of the wheel or disk 39. When said parts are in the position shown in Fig. 6 of the drawings, the wheel 48 is drawn into engagement with the edge of the disk 39 and being wedged between the block 44 and the edge of said disk locks the disk in any position which it may occupy. A spring dog 56 is arranged upon a platform in proximity to each disk 39 and in position to engage the short end of each pivoted arm 41. (See Fig. 4.)

A suitable cable 57 has one end attached to the disk 39, and said cable then passes over a guide pulley 58, supported upon the beams 9, and is connected to the plow-beam by a link or coupling 60. Mounted loosely upon the first shaft-section are the two beveled or miter gears 61 and 62, and secured upon said shaft-section are the clutches 63 and 64. An idler miter-gear 65 is mounted upon a suitable support and meshes with the two gears 61 and 62. The shaft-sections are capable of a slight longitudinal movement in their bearings. A shifting-lever 66 is pivoted upon the frame of the machine and connected with one of said shaft-sections, (see Fig. 1,) and by means of this lever all of the shaft-sections can be moved longitudinally in their bearings, thereby locking either the pinion 61 or the pinion 62 to the shaft, or, by moving the shaft sections to an intermediate position, leaving both of the pinions 61 and 62 loose on the shaft so that the latter is not rotated. The pinion 62 is rotated from the axle 3 by means of suitable sprocket-wheels and the chains 67 and 68. A suitable clutch 69, operated by a lever 70, is provided, so that said shaft may be at any time disconnected from the axle of the machine.

Operation: The parts being in the position shown in Fig. 4 of the drawings and it being desired to raise the plows, the lever 66 is moved into the position shown in Fig. 1 of the drawings, thereby locking the gear 62 to the shaft and causing said shaft to be rotated. The movement of the shaft by the lever 66 brings the arms 40 close to the face of the wheel or pulley 39 and into the plane of the pivoted arm 41. The wheels 39 will at this time all be standing in the position shown in Fig. 4 of the drawings, and the locking-wheel 48 will be out of contact with the face of the wheel 39. As the shaft rotates one of the arms 40 engages one end of the pivoted arm 41 (see dotted lines, Fig. 4,) and thereby the wheel 39 is caused to move with said arm and shaft. The cable 57 will be partially wound upon the edge of the disk or pulley 39, and the plow to which said cable is connected will be lifted from the ground. Just as the plow reaches the highest point to which it is desired to move it, the arm 40 is disengaged from the arm 41, owing to the fact that the disk 39 turns upon the eccentric 38, while the arms 40 are turning with the shaft 31. At the same time the locking-wheel 48 is wedged between the block 44 and the edge of the wheel, and said wheel is locked in this position, thereby holding the plow in its highest or elevated position. Each disk 39 is operated in turn, and thereby all of the plows are raised from the ground and the raising mechanism is locked, thereby preventing the dropping of the plows until the operator desires to begin new furrows. When the arm 40 moves out of engagement with the dog 41, as indicated in Fig. 6, the weighted arm 42 of the dog causes it to swing out of the path of the arms 40, so that the parts do not engage again until the plows have been lowered; thus no harm is done by the further rotation of the shaft in the lifting of the later lifted plows or in case the operator should neglect, when the plows have all been lifted, to move the shaft to its intermediate, idle position. When it is desired to return the plows to the ground, the lever 66 is moved to the opposite position, thereby moving all of the shaft sections longitudinally and moving the arms 40 into the planes of the arms 54. The locking wheels are thereby released and the weight of the plows causes them to descend and the parts to be restored to their normal position, which is that shown in Figs. 4 and 5 of the drawings. The plows are returned to the ground in the same order in which they are raised—that is to say, the first plow is dropped first and the others in succession thereafter—so that the beginnings of the furrows are all in line with one another.

The details of the construction may obviously be varied in many particulars without departing from my invention.

I claim as my invention:

1. The combination, with a suitable platform adapted to be drawn by a tractor and wheels supporting the same, and permitting the platform to follow the surface of the ground independently of the tractor, of a gang of plows arranged to be drawn by said platform as the same is moved over the ground, and power-operated means arranged upon said platform for raising said plows in succession, substantially as described.

2. The combination, with a suitable platform adapted to be flexibly connected to a tractor and its supporting-wheels, substantially as set forth whereby the platform is adapted to follow the surface of the ground independently of the tractor, of a series of plows connected with said platform and arranged to be drawn thereby, and means arranged upon said platform and operated from the axle thereof for lifting said plows in succession, substantially as described.

3. The combination, with a suitable platform and adapted to be flexibly connected to a tractor and supporting wheels therefor, substantially as described whereby the platform is adapted to follow the surface of the ground independently of the tractor, of a gang of plows connected with said platform, and power-operated means arranged upon said platform for lifting said plows in succession from the ground, for the purpose set forth.

4. The combination, with a suitable platform and supporting wheels therefor, of a series of plows arranged in the rear of said platform and connected therewith, a rotatable shaft arranged upon said platform and formed of a series of shaft sections connected together by suitable couplings, means permitting each section to make a partial rotation before moving the next succeeding section, and a lifting mechanism arranged upon each of said sections and connected with the corresponding plow.

5. The combination, with a suitable frame or platform, of a series of plows connected therewith, a rotatable shaft arranged upon said frame or platform and formed of a series of shaft-sections connected together by suitable couplings, means permitting each section to make a partial rotation before moving the next succeeding section, a wheel or pulley upon each shaft-section, and connecting means between each pulley and the corresponding plow, substantially as described.

6. The combination with a suitable platform and supporting wheels therefor, of a series of plows arranged in the rear of said platform and connected therewith, a rotatable shaft arranged upon said platform and formed of a series of shaft-sections connected together by suitable couplings, means permitting each section to make a partial rotation before moving the next succeeding section, a wheel or pulley upon each shaft-section, a flexible connection between each pulley and the corresponding plow, and means for locking each pulley with the plow in an elevated position, substantially as described.

7. The combination of a main plow frame adapted to be hitched to a tractor, means comprising a ground wheel for supporting the frame, and permitting the frame to undulate with the surface of the ground independently of the tractor, a gang of plows connected to the main frame and arranged in a line oblique to the line of draft, mechanism on the frame operable at will for lifting the plows in succession, and driving connections between the ground wheel and said mechanism.

8. The combination of a main plow frame adapted to be hitched to a tractor, and to move vertically, to follow the ground surface independently of the tractor, means comprising a plurality of ground wheels for supporting the frame, a gang of plows connected to the main frame and arranged in a line oblique to the line of draft, mechanism on the frame operable at will for lifting the plows in succession, and driving connections between the ground wheels and said mechanism.

9. The combination of a main plow frame adapted to be hitched to a tractor, and to move vertically, to follow the ground surface independently of the tractor, means comprising an axle and a plurality of ground wheels thereon for supporting the frame, a gang of plows connected to the main frame and arranged in a line oblique to the line of draft, mechanism on the frame operable at will for lifting the plows in succession, and driving connections between the axle and the said mechanism.

10. The combination of a main plow frame adapted to be hitched to a tractor, and to move vertically, to follow the ground surface independently of the tractor, means for supporting the frame comprising an axle arranged transversely of said frame, and a pair of ground wheels thereon, one of the said wheels being disposed at each side of the frame, a gang of plows connected to the main frame and arranged in a line oblique to the line of draft, mechanism on the frame operable at will for lifting the plows in succession, and driving connections between the axle and said mechanism.

11. The combination of a main plow frame adapted to be hitched to a tractor, and to move vertically, to follow the ground surface independently of the tractor, means for supporting the frame comprising a pair of ground wheels arranged one at either side of the frame, a gang of plows connected to the main frame and arranged in a line oblique to the line of draft, mechanism on the frame operable at will for lifting the plows in succession, and driving connections between the ground wheels and said mechanism.

12. The combination of a main plow frame adapted to be hitched to a tractor, and to move vertically, to follow the ground surface independently of the tractor, means comprising a ground wheel for supporting said frame, a gang of plows connected to the main frame and arranged in a line oblique to the line of draft, mechanism on the frame operable at will for lifting the plows in succession, driving connections between the ground wheels and said mechanism, and means for throwing said connections in and out of gear.

13. The combination of a main plow frame adapted to be hitched to a tractor, means comprising a ground wheel for supporting said frame, a gang of plows connected to the main frame and arranged in a line oblique to the line of draft, a series of lifting devices on the frame for the plows respectively, driving connections between the ground wheel and one of the lifting devices, and lost motion connections between the several lifting devices whereby the plows are lifted in succession when the lifting devices are actuated.

14. The combination of a main plow frame adapted to be hitched to a tractor, supporting wheels therefor, a series of plows connected with said frame and arranged in a line oblique to the line of draft, a rotatable shaft arranged upon said frame and formed of a series of shaft sections connected together by suitable couplings, means permitting each section to make a partial rotation before turning the next succeeding section, and a lifting mechanism arranged upon each of the said sections and connected with one of the plows.

15. The combination of a main plow frame adapted to be hitched to a tractor and arranged in a line oblique to the line of draft, a series of plows connected therewith, a rotatable shaft arranged upon said frame and formed of a series of shaft sections connected by suitable couplings, means permitting each section to make a partial rotation before turning the next succeeding section, a wheel or pulley upon each shaft section, and connecting means between each pulley and one of the plows.

16. The combination of a main plow frame adapted to be hitched to a tractor, supporting wheels therefor, a series of plows connected with said frame and arranged in a line oblique to the line of draft, a rotatable shaft arranged upon said frame, and formed of a series of shaft sections connected by suitable couplings, means permitting each section to make a partial rotation before turning the next succeeding section, a wheel or pulley upon each shaft section, a flexible connection between each pulley and one of the plows, and means for locking each pulley with its plow in an elevated position.

17. The combination of a main plow frame adapted to be hitched to a tractor, a gang of plows connected to said frame in a line oblique to the line of draft, a shaft mounted on the frame, means controllable at will for actuating said shaft, and means operable by successive actuations of the shaft to raise the plows in succession and to lower the plows in succession.

18. The combination of a main plow frame adapted to be hitched to a tractor, a gang of plows connected to said frame in a line oblique to the line of draft, a series of lifting devices on the frame adapted to be successively actuated to lift and lower the plows in succession, and means for driving said devices, said means being adapted by successive actuations to lift the plows in succession and lower them in succession.

19. The combination of a main plow frame adapted to be hitched to a tractor, a gang of plows connected to the frame in a line oblique to the line of draft, a series of devices for successively lifting and successively lowering the plows, means for locking said series of devices when the plows are lifted, and a shaft on the frame adapted on one actuation to drive the lifting devices to lift the plows in succession, and on a second actuation to disengage the said locking means to permit the plows to fall in succession.

20. The combination of a main frame adapted to be hitched to a tractor, a gang of plows connected to said frame in a line oblique to the line of draft, mechanism on the frame adapted to successively lift and to successively lower the plows, and a single manually controlled device for controlling the lifting and the lowering of the plows.

21. The combination of a main plow frame adapted to be hitched to a tractor, and to move vertically, to follow the ground surface independently of the tractor, a gang of plows connected to said frame in a line oblique to the line of draft, devices for successively lifting the plows which comprise driving and driven parts, and means whereby the driving parts are automatically disengaged from the driven parts when the plows have been lifted.

In testimony whereof I hereunto affix my signature in the presence of two witnesses.

WALTER GREGORY.

Witnesses:
CHAS. C. GREEN,
M. M. TAYLOR.

Copies of this patent may be obtained for five cents each, by addressing the "Commissioner of Patents, Washington, D. C."